UNITED STATES PATENT OFFICE.

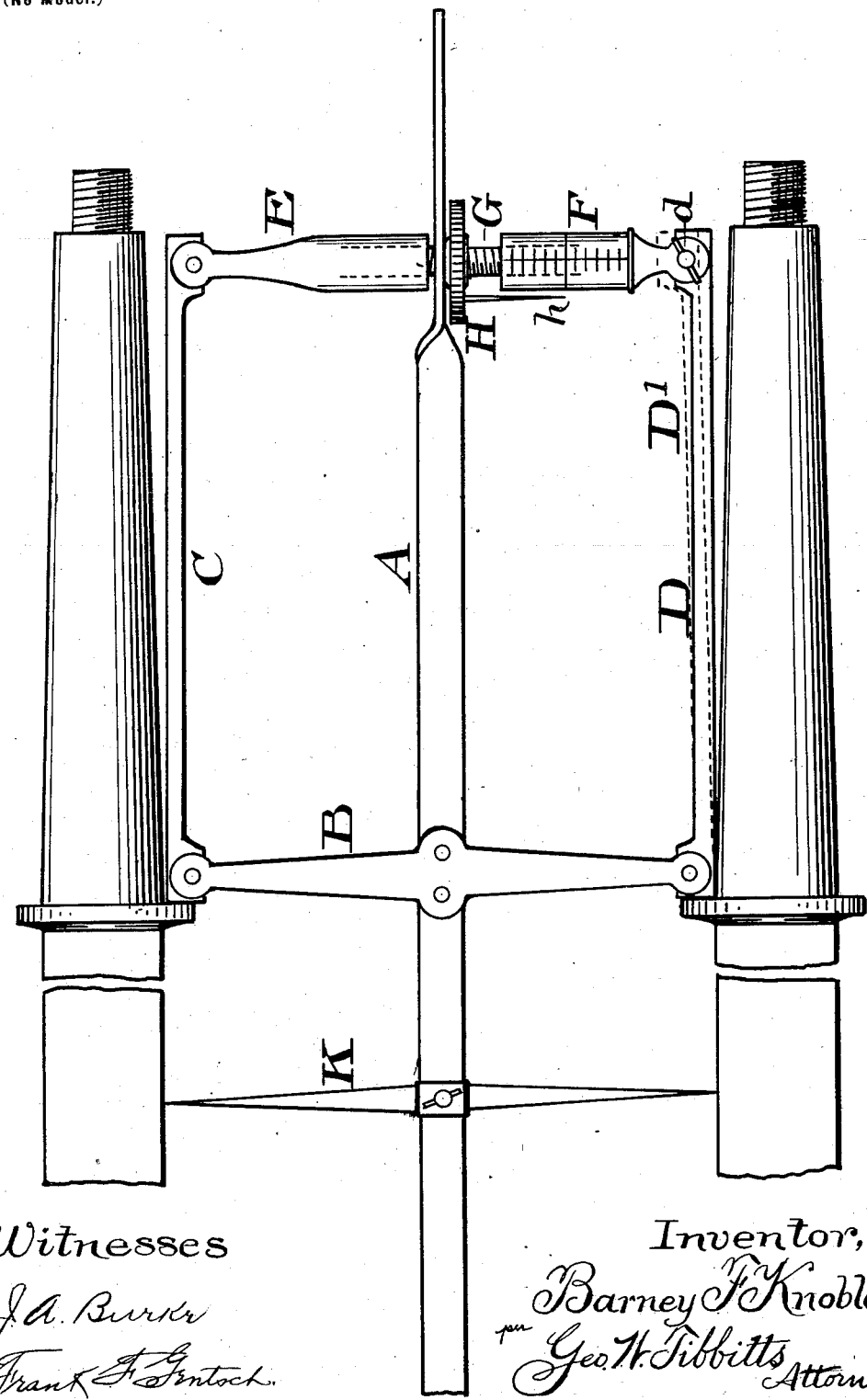

BARNEY F. KNOBLOCH, OF CLEVELAND, OHIO.

AXLE-GAGE.

SPECIFICATION forming part of Letters Patent No. 657,602, dated September 11, 1900.

Application filed November 4, 1899. Serial No. 735,845. (No model.)

*To all whom it may concern:*

Be it known that I, BARNEY F. KNOBLOCH, a citizen of the United States of America, and a resident of Cleveland, in the county of Cuyahoga and State of Ohio, have invented certain new and useful Improvements in Automatic Axle-Sets, of which the following is a specification.

This invention relates to the setting of wagon-axles; and it consists of a new and novel implement or device, which I call an "automatic adjustable gage," specially adapted for accurately and quickly setting axles, and it is constructed to operate substantially as hereinafter described, and pointed out in the claims.

In the accompanying drawing, which illustrates the construction and method of using my new device, the figure is a plan view of the implement as seen applied to the axle in the operations of adjusting it to forms to which the axles are to be bent in setting. The scale on which this drawing is made is two-thirds of full size of the implement.

A represents a flat iron bar which is about the length of an ordinary wagon-axle. At about eight inches from one end said bar is twisted one-quarter around to make the flat sides of this short portion transverse to the main part. B is a cross-bar fixed onto said bar A at a suitable distance from the said twisted part. C D are two side bars pivotally attached to the ends of the cross-bar B and extend forward parallel to the main bar A to a point a little beyond the said twist. E F are arms, also pivotally attached to the ends of the said side bars C D. G is a right and left hand screw fixed to rotate in the short part of said main bar A and provided with a thumb-disk H, by means of which said screw may be turned. The inner ends of the arms E F are tapped to receive the ends of the screw G. On the arm F is laid off a scale of the fractions of an inch. The scale is made double—that is, the zero or starting mark is at the middle of the scale—so that calculations can be made either way, as will be hereinafter described. On the thumb-disk is attached a pointer *h* to serve as a guide in setting the implement to the required scale. The joint connection of the arm F to the side bar D is made with a thumb-screw *d* to enable said joint to be opened when required in adjusting the implement.

K is an adjustable cross-bar on the main bar A, for use hereinafter shown.

The manner of using this implement is as follows: The spindles of wagon-axles have to be bent to an angle relative to the dish of the wheel. The purpose of this implement is to greatly facilitate and expedite the work. First measure the depth of the dish of the wheel at the hub. Next unscrew the thumb-screw *d*. This frees arm F from bar D. Now revolve arm F on the screw G until the pointer *h* indicates said dish depth on the scale. Then again fix said arm F to the bar D by returning the screw *d* to place. This adjustment of the side bar D will be on the lines indicated by the dotted lines D'. Now if the spindle has no taper this new line of the bar D determines the angle to which the spindle is to be bent. Thus the implement is set for use by which all the axles for a wagon are to be set; but if the spindle has a taper like those shown in the drawing then to ascertain the proper angle the opposite side of the implement is placed against the axle, with the heel of bar C up against the shoulder of collar *c* and with the end of the cross-bar K resting against the middle body portion of the axle. Now the operator rotates the screw G to expand the bars C D to meet the taper. This fixes the angle on the implement for setting tapered axles. This description is intended for application of the implement to the under side of the axle; but if, as in the case of crank-axles, the implement be applied to the upper side of the axle, in which case the implement is adjusted in a reverse order—that is, the scale-arm F is revolved in the opposite direction—this carries arm D outward and sets the angles of the implement reversely to those hereinbefore described.

In applying the implement the projecting portion of the short end of the main bar A is used as a handle for convenience in manipulating the device.

Having described my invention, what I claim is—

The axle-setting gage, consisting of main central bar A, fixed cross-bar B, side bars C D pivotally attached to the ends of said cross-bar B, arms E F, pivotally attached, respectively, to the ends of said side bars C D, the right and left hand screw G provided with thumb-disk H and loosely held in the bar A, said screw G working in the tapped inner ends of said arms E and F, the arm F having the scale marked thereon, the pointer $h$ attached to the thumb-disk H, and the adjustable cross-bar K mounted on the main bar A, constructed and adapted to operate substantially as described and for the purpose set forth.

Signed by me at Cleveland, Ohio, this 1st day of November, 1899.

BARNEY F. KNOBLOCH.

Witnesses:
GEO. W. TIBBITTS,
CHARLES L. STOCKER.